United States Patent [19]

McCracken et al.

[11] Patent Number: 4,629,585
[45] Date of Patent: Dec. 16, 1986

[54] ANTISTATIC FOAMED POLYMER COMPOSITION

[75] Inventors: Wendell J. McCracken, South Bend; Roger C. Schmidt, Mishawaka, both of Ind.

[73] Assignee: Uniroyal Plastics Company, Inc., Middlebury, Conn.

[21] Appl. No.: 624,899

[22] Filed: Jun. 27, 1984

[51] Int. Cl.$^4$ ............................................... H01B 1/06
[52] U.S. Cl. ..................... 252/511; 524/495; 524/496; 524/910; 524/911
[58] Field of Search ............... 252/502, 511; 524/495, 524/496, 911, 910, 913, 914, 915, 500, 502, 504, 515, 524

[56] References Cited

U.S. PATENT DOCUMENTS

| | | | |
|---|---|---|---|
| 4,431,575 | 2/1984 | Fujie et al. | 252/511 |
| 4,505,973 | 3/1985 | Neet et al. | 252/511 |
| 4,525,297 | 6/1985 | Yamane et al. | 252/511 |
| 4,526,952 | 7/1985 | Zeitler et al. | 252/511 |

FOREIGN PATENT DOCUMENTS 141431  9/1982  Japan .

Primary Examiner—Josephine L. Barr
Attorney, Agent, or Firm—William E. Dickheiser

[57] ABSTRACT

A foamable antistatic polymer composition is provided comprising a thermoplastic polymer, an elastomeric polymer, conductive carbon black having BET surface area of at least 500 m$^2$/g and an amount of a blowing agent effective to expand said composition.

12 Claims, No Drawings

ANTISTATIC FOAMED POLYMER COMPOSITION

This invention relates to an antistatic composition based on a blend of a thermoplastic polymer, an elastomeric polymer, conductive carbon black, and an effective amount of blowing agent to expand or foam said composition.

Highly electrically conductive carbon black is known to be used in the compounding of plastics, elastomers and coatings, in applications where electrical conductivity is required. Many approaches have been used to make solid products having relatively low surface or volume resistivity by incorporating carbon black in such products. In many instances, the amount of such carbon black necessary for acceptable conductivity levels has a detrimental effect on the other physical properties of the composition such as tensile strength, flexural modulus, and the like.

In the case of a foamed or expanded polymer, it has been the practice to treat the surface of such composition with certain electricity dissipating materials. Such coatings invariably have the tendency to wear off due to handling, evaporation/sublimation or damage to the surface.

U.S. Pat. No. 4,421,678, to Mehta, discloses an electrically conductive composition including carbon black. U.S. Pat. No. 4,321,162 also discloses the use of carbon black in connection with a polymer composition to achieve electrical conductivity.

U.S. Pat. No. 4,265,789 is yet another patent which discloses the use of carbon black or other fine conductive particles dispersed in a high molecular weight polymer.

None of the prior art teaches or suggests Applicants' discovery that by using an effective amount of blowing agent to expand or foam the polymeric composition containing conductive carbon black, the surface conductivity of the blend is greatly enhanced.

In accordance with Applicants' invention, it has also been observed that processing conditions of a polymer blend containing conductive carbon black affect the conductive properties, i.e., longer processing times, with other conditions being the same, lead to higher surface resistivity. In accordance with Applicants' invention, the expansion of the polymers unexpectedly overcomes the reduced conductivity effects. Handling or damage to the expanded foams of the applicants' invention does not reduce the surface conductivity.

In accordance with the invention, the composition comprises a blend of a thermoplastic and elastomeric polymer, conductive carbon black having a BET surface area of at least 500 $m^2/g$, and an amount of a blowing agent effective to expand said composition under foaming conditions. Table A below indicates the relative percentages and weights of the ingredients of the invention and the resulting surface resistivity:

TABLE A

| Item | Broad | Preferred | Most Preferred |
|---|---|---|---|
| Thermoplastic/Elastomer (wt) | 90/10–10/90 | 80/20–50/50 | 75/25–65/35 |
| Blowing agent, % (wt) | 2–20 | 4–12 | 6–9 |
| Conductive carbon black, % (wt) | 5–25 | 8–15 | 9–12 |
| Surface resistivity, ohms/square | $10-10^{13}$ | $10^2-10^7$ | $10^3 \times 10^6$ |

The thermoplastic polymer may be those based on polyethylene, polypropylene, polyacrylonitrile, polyacetates, poly(acrylic acid, anhydride or esters), poly(vinyl chloride), graft polymers such as ABS or EPDM grafted with polymerizable monomers such as recited above, preferably based upon ABS, PVC, poly(methyl acrylate), poly(butyl acrylate) and most preferably, upon ABS or PVC.

The elastomer polymer may be natural rubber, butadiene rubber, poly(butadiene-styrene), EPDM, butyl rubber, poly(butadiene-acrylonitrile), chlorinated polyethylene with poly(butadienestyrene) and poly(butadiene-acrylonitrile) being preferred and, most preferably, poly(butadiene-acrylonitrile).

For a blowing agent, a liquid or gaseous nitrogen, halogenated hydrocarbon having a boiling point below 25° C., may be used as well as a chemical blowing agent such as azodicarbonamide (AZDC), toluenesulfonyl hydrazide (TSH), oxybis(benzenesulfonylhydrazide) (OBSH), sodium bicarbonate or activated forms thereof; AZDC, TSH and OBSH are preferred.

Conductive carbon blacks useful for this invention usually have a BET surface area of 500 $m^2/g$ or higher (as measured by $N_2$ absorption), preferably at least 750 $m^2/g$, and most desirably at least 1,000 $m^2/g$. Besides polymer, blowing agent and conductive carbon black, there may be present additional filler, processing aids, extender oils, curatives, U.V. stabilizers, antioxidants and the like.

The instant invention may find uses for the protection of electronic devices against the build-up of static electricity, conductive work surface mats, and conductive carpet underlay.

The composition may be prepared using an internal Banbury (trademark) type mixer, transfer mixer, open mill or other suitable means; one-shot addition of all ingredients or two-step methods depending on the ingredients used. The preparation of the composition of the instant invention is illustrated in the following examples:

EXAMPLE 1

An antistatic polymer composition was prepared in a two-step fashion using the following recipe:

| (A) Ingredients, % weight | |
|---|---|
| NBR-1[1] | 7.2 |
| NBR-2[2] | 8.8 |
| CCB[3] | 11.3 |
| PVC[4] | 37.6 |
| Plasticizer[5] | 26.3 |
| Stabilizer[6] | 0.4 |
| ESO[7] | 1.7 |
| Antioxidant[8] | 0.2 |
| CAC[9] | 2.0 |
| $CaCO_3$ | 2.4 |
| Processing aids[10] | 1.8 |
| Stearic acid | 0.3 |

-continued

| (A) Ingredients, % weight | |
|---|---|
| Total | 100 |

Remarks
(1)Poly(butadiene (71%)-Acrylonitrile (29%)); ML-4 = 80 at 100° C.
(2)Poly(butadiene (68%)-Acrylonitrile (32%)); ML-4 = 80 at 100° C.
(3)Conductive Carbon Black, BET Surface area: ca. 1000.
(4)Poly(vinyl chloride); Inh. visc. = 0.94.
(5)Phthalate-type esters.
(6)Dibutyltinbis(isoctylthioglycolate).
(7)Epoxidized soybean oil.
(8)Tris(monylated phenyl)phosphite.
(9)Chlorendic anhydride compound.
(10)Mixture of aromatic hydrocarbon resin and fatty acid ester.

The above materials were blended in a Banbury mixer for 2 minutes at 30 RPM, cooling water on. After scrape down, mixing was continued for 4 minutes at 20 RPM, and the mixing chamber was scraped down. Mixing was resumed at 30 RPM while maintaining 335° F. (168° C.) blend temperature for about 1.5 minutes. The batch was removed and then passed through a two-roll mill three times and then sheeted out to 0.2 in (0.51 cm) thickness.

Blending was continued by using the above mixture (A) in combination with further ingredients below:

| (B) Ingredients, % weight | |
|---|---|
| Blend A | 85 |
| CaCO$_3$ | 2.6 |
| Calcium stearate | 0.5 |
| Zinc oxide | 0.1 |
| Azodicarbonamide(1) | 8.1 |
| Extender oil | 0.5 |
| Plasticizer(2) | 0.7 |
| Accelerators(3) | 1.1 |
| Modifier(4) | 0.9 |

Remarks:
(1)Blowing agent
(2)See A(5)
(3)Mixture of mercaptobenzothiazole, diethylthiourea, hexamethylene-tetramine and zincbis(dibutyldithiocarbamate).
(4)Aliphatic polyol.

The above materials were essentially blended to a homogenous composition for 5 minutes at no more than 260° F. (°C.), after which time the blend was removed, milled, and then passed through an extruder set at 220° to 270° F. (104° to 132° C.) resulting in a sheet being 18 in. wide, 36 in. long and 0.6 in. thick (45.72 cm wide, 91.4 cm long and 1.52 cm thick).

A portion of this sheet was not expanded and the surface resistivity was determined on this portion to be $1 \times 10^9$ S.R. ohms/square as shown in Run 2 below. Another portion of the sheet was exposed to a temperature above the decomposition temperature of the blowing agent (about 205° C. in the case of the azodicarbonamide blowing agent incorporated in the composition) and than post cured in an oven for about 45 minutes at 300° F. (127° C.), resulting in a conductive foam having the physical properties listed under Run 1 below:

| Run No. | 1 | 2* | ASTM Method |
|---|---|---|---|
| Density, lb./ft$^3$ | 3.5 | — | D-1667 |
| Tensile strength, psi | 40 | — | D-412 |
| Elongation, % | 150 | — | D-412 |
| S.R., ohms/square | $1 \times 10^3$ | $1 \times 10^9$ | D-257 |

Remarks:
*Measurement taken on non-expanded sheet stock.

The above comparison experiment indicates the remarkable improvement achieved regarding surface conductivity when expanding composition of this invention.

EXAMPLE 2

Following essentially the procedure of Example 1, except in recipe (A), the level of conductive carbon black was varied; the resultant closed cell foam had the surface resistivity listed below.

| Run No. | 3 | 4 | 5 | 6 | 7 | |
|---|---|---|---|---|---|---|
| CCB, parts* | 5.4 | 6.8 | 8.2 | 9.5 | 13.6 | |
| S.R., ohms/square | $10^{11}$ | $10^5$ | $10^4$ | $10^3$ | $10^2$ | |

*per 100 parts of Blend A

These results demonstrate the low resistivity values obtainable at surprisingly low conductive carbon black (CCB) levels.

EXAMPLE 3

The effect of blowing agent concentration was evaluated following substantially the recipes and procedure of Example 1 except for variations in azodicarbonamide concentration.

| Run No | 8 | 9 | 10 | 11 |
|---|---|---|---|---|
| AZDC*, parts | 4.1 | 5.4 | 6.8 | 8.2 |
| Density. lb/ft$^3$ | 9 | 7.5 | 5.5 | 4.5 |
| S.R., ohms, square | $10^3$ | $10^3$ | $10^3$ | $10^3$ |

*azodicarbonamide, parts per 100 parts Blend B

The above results show that even at relatively low levels of expansion, the surface resistivity can be reduced to an unexpectedly large degree.

What is claimed is:

1. A foamable antistatic polymer composition comprising:
   (a) at least one thermoplastic polymer selected from the group consisting of polyethylene, polypropylene, polyacrylonitrile, polyacetate, poly(acrylic acid), poly(acrylic acid anhydride), polyacrylate, poly(vinyl chloride) and ABS and EPDM graft polymers thereof;
   (b) at least one elastomeric polymer selected from the group consisting of natural rubber, butadiene rubber, poly(butadiene-styrene), EPDM, butyl rubber, poly(butadiene-acrylonitrile) and chlorinated polyethylene;
   (c) conductive carbon black having a BET surface area of at least 500 m$^2$/gram; and
   (d) a blowing agent;
   wherein the weight ratio of component (a) to component (b) is between 80:20 and 10:90; and
   wherein component (c) comprises between 5 and 25 weight percent of the total weight of components (a), (b), (c) and (d); and
   wherein component (d) comprises between 2 and 20 weight percent of the total weight of components (a), (b), (c) and (d).

2. The composition of claim 1 wherein the weight ratio of component (a) to component (b) is between 80:20 and 50:50.

3. The composition of claim 2 wherein the weight ratio of component (a) to component (b) is between 75:25 and 65:35.

4. The composition of claim 1 wherein component (c) comprises between 8 and 15 weight percent of the total weight of components (a), (b), (c) and (d).

5. The composition of claim 4 wherein component (c) comprises between 9 and 12 weight percent of the total weight of components (a), (b), (c) and (d).

6. The composition of claim 1 wherein component (d) comprises between 4 and 12 weight percent of the total weight of components (a), (b), (c) and (d).

7. The composition of claim 6 wherein component (d) comprises between 6 and 9 weight percent of the total weight of components (a), (b), (c) and (d).

8. The composition of claim 1 wherein component (a) comprises poly(vinylchloride).

9. The composition of claim 1 wherein component (b) comprises poly(butadiene-acrylonitrile).

10. The composition of claim 1 wherein component (d), the blowing agent, comprises at least one member selected from the group consisting of azodicarbonamide, toluenesulfonyl, hydrazide, sodium bicarbonate and oxybis(benzenesulfonylhydrazide).

11. The composition of claim 1 wherein component (c), the carbon black, has a surface area of at least 1000 m$^2$/gram.

12. A foamable antistatic polymer composition comprising:
   (a) poly(vinylchloride);
   (b) poly(butadiene-acrylonitrile);
   (c) conductive carbon black having a BET surface area of more than 1000 m$^2$/gram; and
   (d) at least one member selected from the group consisting of azodicarbonamide, toluenesulfonyl and oxybis(benzenesulfonylhydrazide);
   wherein the weight ratio of component (a) to component (b) is between 80:20 and 50:50;
   wherein component (c) comprises between 5 and 25 weight percent of the total weight of components (a), (b), (c) and (d); and
   wherein component (d) comprises between 2 and 20 weight percent of the total weight of components (a), (b), (c) and (d).

* * * * *